M. PETRIC.
HORSESHOE.
APPLICATION FILED MAR. 22, 1917.

1,241,016.

Patented Sept. 25, 1917.

Inventor
M. Petric

By A. M. Wilson
Attorney

UNITED STATES PATENT OFFICE.

MARTIN PETRIC, OF DETROIT, MICHIGAN.

HORSESHOE.

1,241,016.  Specification of Letters Patent.  Patented Sept. 25, 1917.

Application filed March 22, 1917. Serial No. 156,712.

*To all whom it may concern:*

Be it known that I, MARTIN PETRIC, a subject of the King of Hungary, residing at Detroit, in the county of Wayne and State of Michigan, have invented certain new and useful Improvements in Horseshoes, of which the following is a specification.

This invention relates to certain new and useful improvements in horseshoes.

The primary object of the invention is the provision of a horseshoe having a removable calked tread plate, the construction being such that a base member is adapted for permanent attachment to the hoof of the animal for the ready support of tread plates of different desired constructions.

A further object of the device is the provision of a two-part horseshoe possessing great strength and being easily and cheaply manufactured, the shoe being readily adaptable for use during the different seasons of the year as well as for different kinds of use by the animal wearing same.

With these general objects in view and others that will appear as the nature of the invention is better understood, the same consists in the novel construction, combination and arrangement of parts hereinafter more fully described, illustrated in the accompanying drawings, and then claimed.

In the drawings forming a part of this application and in which like designating characters refer to corresponding parts throughout the several views:—

Figure 1:
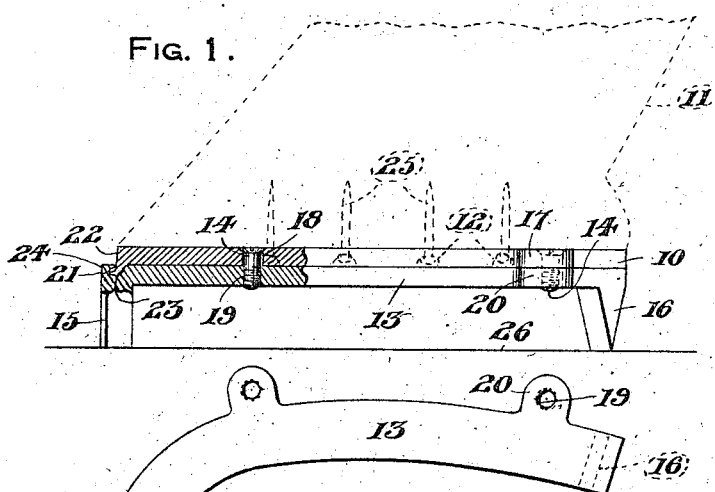
Figure 1 is a side elevation of the device partially broken away with the supporting hoof indicated by the dotted lines.

The device being designed for employment after the manner of the usual horseshoe, the same broadly consists of a hoof-engaging base plate 10 flatly secured to the bottom of the hoof 11 by means of the usual horseshoe nails extending through perforations 12 in the said plate, a tread plate 13 of the same horseshoe shape as the base 10 being removably attached thereto by means of screws 14, the said tread plate 13 preferably having a toe calk 15 and heel calks 16.

Figure 2:
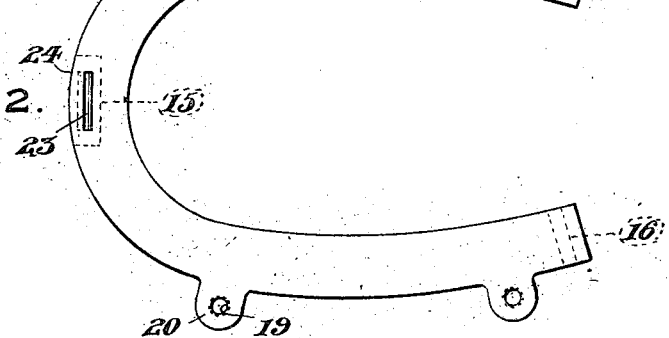
Fig. 2 is a top plan view of the tread plate removed.
Figure 3:
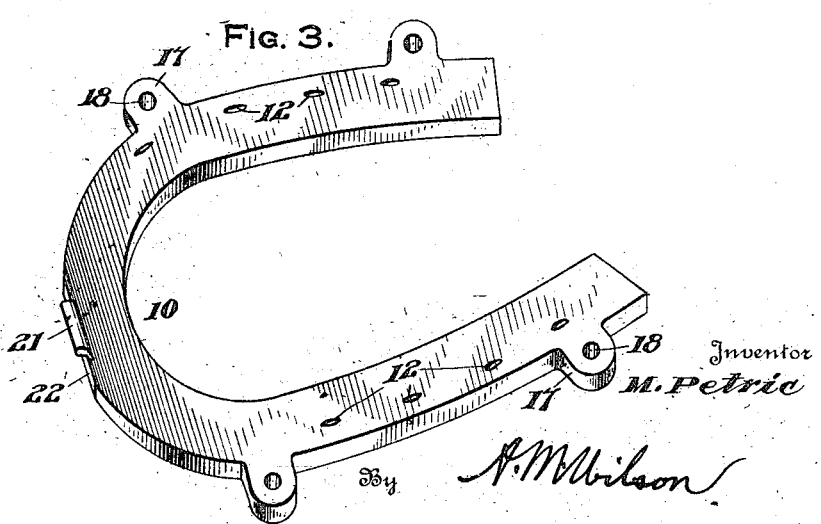
Fig. 3 is a bottom plan view of the hoof plate or base detached.

Peripheral lugs 17 are carried by the base 10 having perforations 18 therethrough for receiving the screws 14, the latter being adapted for engagement within threaded perforations 19 of ears 20 projecting from the tread plate 13 in alinement with the said lugs. A curved flange or lip 21 forwardly projects from the front squared portion 22 of the base plate 10 adapted for seating engagement within an elongated forwardly inclined socket 23 in the upper face of the toe portion 24 of the tread plate 13. By this arrangement it will be seen that the base plate 10 is normally secured as permanently as possible to the bottom of the hoof 11 by means of the nails 25 and in which position the tread plate 13 is adapted to be fixed in flat engagement therewith by positioning the lip 21 within the socket 23 and tightening the screws 14 through the lugs 17 and into the ears 20. It will be observed from an inspection of Figs. 2 and 3 that the contour of the base plate 10 and tread plate 13 is identical to each other so that when the parts are assembled, and retained by the fastening screws 14, in superposed relation as shown in Fig. 1, the tread plate 13 underlies the nail receiving perforations 12 in the base plate 10 and tends to hold the shoe nails 25 in position in the hoof 11 without the necessity of turning-over the entering ends of the nails, thereby obviating undue injury to the hoofs of the animal. The tread plate 13 is thereby operatively mounted upon the base plate 10 for positioning the calks 15 and 16 upon the road-way such as 26. The tread plate 13 may be readily detached by removing the screws 14 while any other form of tread may thereafter replace the same, such for instance, as a tread plate unprovided with calks or having differently formed calks from those herein illustrated. In this manner, the horseshoeing operation consists of only attaching the base plate 10 to the hoof 11 while any desirable form of tread plate 13 may be readily attached to and removed from the base plate by the owner of the animal. A serviceable article of manufacture is arranged of simple construction and possessing great strength and utility.

What I claim as new is:—

A horseshoe consisting of a base having its forward end squared and provided with a lip or flange projecting downwardly from its lower surface and forwardly of said squared-end portion, said downwardly projecting lip or flange being also curved forwardly at its lower end, and a tread-plate having its forward end projecting beyond the face of the squared portion of said base, said base projecting portion having a socket opening upwardly through its upper surface and extending downwardly in a corresponding contour as, and receiving said lip or flange, said base and tread-member having laterally projecting and registering fastening receiving ears.

In testimony whereof I affix my signature.

MARTIN PETRIC.